(12) United States Patent
Fan et al.

(10) Patent No.: US 8,550,367 B2
(45) Date of Patent: Oct. 8, 2013

(54) SYSTEM AND METHOD FOR EMBEDDING MACHINE-READABLE CODES IN COMBINATION WITH OTHER IMAGES SUCH AS LOGOS

(75) Inventors: Zhigang Fan, Webster, NY (US); Yonghui Zhao, Penfield, NY (US); Hengzhou Ding, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/552,170

(22) Filed: Jul. 18, 2012

(65) Prior Publication Data

US 2013/0228629 A1 Sep. 5, 2013

Related U.S. Application Data

(60) Provisional application No. 61/605,471, filed on Mar. 1, 2012.

(51) Int. Cl.
*G06K 19/06* (2006.01)

(52) U.S. Cl.
USPC ............. 235/494; 235/454; 235/462.09

(58) Field of Classification Search
USPC ............. 235/494, 454, 487, 375, 462.09
See application file for complete search history.

(56) References Cited

U.S. PATENT DOCUMENTS

| | | | |
|---|---|---|---|
| 2003/0152293 A1* | 8/2003 | Bresler et al. | 382/305 |
| 2010/0074443 A1* | 3/2010 | Ishii et al. | 380/243 |

* cited by examiner

*Primary Examiner* — Edwyn Labaze
(74) *Attorney, Agent, or Firm* — Fox Rothschild LLP (57) ABSTRACT

A process for embedding a barcode into an image generates an extended barcode that includes a number of copies of the barcode. The extended barcode is embedded into the original image and a textured image is generated. A barcode region is selected that includes a machine-readable copy of the barcode. A transition region is selected that includes a set of pixels that are within a predetermined distance from the barcode region. The textured image is combined with the original image to produce the output image based on the barcode and transition regions.

20 Claims, 7 Drawing Sheets

SYSTEM AND METHOD FOR EMBEDDING MACHINE-READABLE CODES IN COMBINATION WITH OTHER IMAGES SUCH AS LOGOS

RELATED APPLICATIONS

This application claims priority under 35 U.S.C. §119 to U.S. Provisional Patent Application No. 61/605,471 filed 1 Mar. 2012, entitled "SYSTEM FOR EMBEDDING MACHINE-READABLE CODES IN OTHER IMAGES SUCH AS LOGOS," the disclosure of which is incorporated herein by reference.

This application is related to U.S. patent application Ser. No. 13/552,162, filed concurrently hereto, titled SYSTEM AND METHOD FOR CREATING MACHINE-READABLE CODES IN COMBINATION WITH OTHER IMAGES SUCH AS LOGOS; and U.S. patent application Ser. No. 13/552,177, filed concurrently hereto, titled SYSTEM AND METHOD FOR EMBEDDING MACHINE-READABLE CODES IN A DOCUMENT BACKGROUND.

BACKGROUND

Symbologies, such as matrix symbologies and two-dimensional barcodes, have become a widely accepted tool for sharing small amounts of data, and for tracking objects that are marked with the barcode. Examples of barcodes include Universal Product Codes (UPC), data matrix, codes, Quick Response (QR) codes, Aztec codes, Maxi codes, and the like.

A barcode may be scanned and read by a wide variety of devices, including, but not limited to, cellular telephones, digital cameras, smartphones, personal digital assistants, tablet devices, electronic readers, personal computers and portable satellite navigation devices. The generation of the various barcodes are governed by established international standards, e.g. ISO/TEC 18004:2006 covering QR codes.

Two-dimensional barcodes, such as QR codes, have become a widely accepted method for printing mechanically readable encoded data. The codes can be used in official documents such as certificates and diplomas to verify the authenticity. For example, assigning a unique QR code to an official document and tying authentication data to the code allows for the validation of the document.

The barcodes are typically printed as an independent entity in the page, separated from other objects such as pictures, text, graphics, and logos. However, it is sometimes desirable to have barcodes embedded in other objects, such as logos and seals, to make the document aesthetically more appealing. Color barcodes have been designed to mimic simple logo type graphics, which can be found in many websites. However, most methods work best when the logo and the barcode have similar sizes. However, in many desired applications, the barcode sometimes might be much smaller.

A straightforward approach would scale the barcode up to match the size of the logo. This approach has some significant drawbacks, however. For example, a QR code printed with 4×4 pixels per cell using a 300 dpi printer, has a size of about 0.8×0.8 cm², while a logo may have a size of 5×5 cm². A straightforward approach would cause significant image quality degradation. Another possible solution is to embed the barcode in one part of the image, for example, one corner of the image. The barcode would not look like a natural fit and would appear "pasted," not "embedded." Therefore a need exists for a method to combine a logo with a barcode that avoids these disadvantages and/or other potential issues.

SUMMARY

A method and system of creating an embedded barcode in an image are disclosed. The method includes generating an extended barcode comprising a plurality of copies of a barcode by replicating the barcode into a matrix having a size that is at least as large as a size of an original image. The method also includes generating a textured image comprising a composite of the extended barcode and the original image so that the extended barcode extends at least to all edges of the original image. A barcode region is selected that includes a copy of the barcode, and a transition region is selected that includes a set of pixels that are within a predetermined distance from the barcode region. An output image is generated by combining the textured image with the original image based on the barcode region and the transition region.

In another aspect, an electronic device is disclosed that includes a processor and a computer-readable memory containing a barcode image embedding application that includes programming instructions. The instructions are capable of instructing the processor to generate an extended barcode by replicating a barcode into a matrix having a size that is at least as large as a size of an original image. The instructions are capable of instructing the processor to generate a textured image comprising a composite of the extended barcode and the original image so that the extended barcode extends at least to all edges of the original image. The program instructions are also capable of instructing the processor to select a barcode region that includes a copy of barcode and a transition region that includes a set of pixels that are within a predetermined distance from the barcode region. An output image is generated by the processor by combining the textured image with the original image based on the barcode region and the transition region.

In another aspect, a computer program product containing a set of instructions that, when executed, instruct a processor of an electronic device to implement a method. The method includes generating an extended barcode by replicating a barcode into a matrix having a size that is at least as large as a size of an original image. The method also includes generating a textured image comprising a composite of the extended barcode and the original image so that the extended barcode extends at least to all edges of the original image. A barcode region is selected that includes a copy of barcode and a transition region that includes a plurality of pixels that are within a predetermined distance from the barcode region. An activity index map is generated by determining an activity index for each pixel in the original image based on the barcode region and the transition region. A location index map is generated by determining a distance index for each pixel in the textured image based on the barcode region. An output image is generated by combining the textured image with the original image based on the activity index map and the distance index map.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The term "data" may refer to physical signals that indicate or include information. A "data bit" may refer to a single unit of data. An "image," as a pattern of physical light or a collection of data representing the physical light, may include characters, words, symbologies, graphics and other features, as well as combinations thereof. A "digital image" is by extension an image represented by a collection of digital data. A "logo" refers to one or more graphical elements and/or any combination thereof.

A "barcode" is a pattern or symbol that that is displayed on a surface and which represents data. Barcodes may be an optical, machine-readable representation of data. Barcodes may include, without limitation, one-dimensional symbologies, two-dimensional (2D) symbologies, or three-dimensional symbologies. Examples of two-dimensional barcodes include data matrix codes, quick response codes, Aztec codes, Maxi codes and the like. The barcodes may be displayed on an electronic display, and may be of any geometric shape or size. In this document, the terms "barcode" or "matrix code" may be used in the examples, but the term is intended to include any such symbology. For the purposes of this application, a "copy" of a barcode refers to at least a portion of the barcode sufficient to allow the barcode to be fully read by a machine or scanner.

A "gamut" refers to a subset of colors which can be accurately represented in a particular medium. For example, a "printer gamut" refers to the subset of chromaticities that can be reproduced by a particular printer. An "image gamut" refers to a subset of colors from the printer gamut that are present in a given image produced by the printer. A "virtual gamut" refers to a set of colors calculated from the average reflectance of combined light and dark color pairs that selected from the printer gamut. The term "average" as used herein refers to an approximate value intermediate to a set of values.

An "electronic device" refers to a device that includes an imaging device, a processor and tangible, computer-readable memory. The memory may contain programming instructions in the form of a software application that, when executed by the processor, causes the device to perform one or more barcode scanning operations according to the programming instructions. Examples of suitable devices include portable electronic devices such as smartphones, personal digital assistants, cameras, tablet devices, electronic readers, personal computers, media players, satellite navigation devices and the like.

In this disclosure, a method for embedding a QR code into a logo or any other type of graphical element is presented. The proposed method is compatible with the various barcode decoding technologies. For example, the resulting barcodes may be readable by standard decoders, including both laser and imaging readers. Although the examples focus on a two-dimensional or quick response (QR) code, it is extensible to other barcode systems, such as Data Matrix. As mentioned above, many methods of embedding QR or other two-dimensional machine-readable codes in logos or other images work best when the logo and the barcode having similar sizes. However, the desired barcode may often be much smaller than the image in which it is desired to be embedded.

Figure 1:
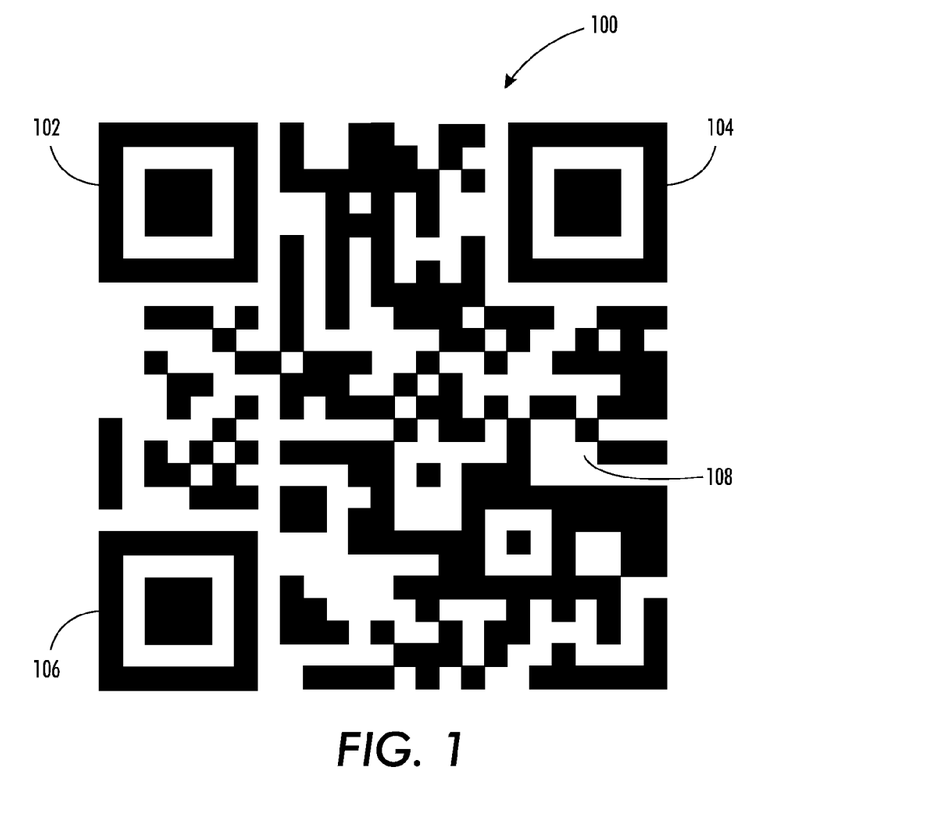
FIG. 1 depicts one embodiment of a barcode in accordance with an aspect of the present disclosure.

Referring to FIG. 1, an example of a barcode 100 is shown. In an embodiment, this code is generated according to a standard promulgated by the International Organization for Standards (ISO), e.g. ISO/IEC 18004: 2006. In FIG. 1, a barcode according to an aspect of the present disclosure may be a quick response code 100. The barcode 100 may contain one or more position detection elements 102, 104, 106 and a data portion 108 made of a set of informational elements. Each element may be a pixel or a group of pixels.

Figure 2:
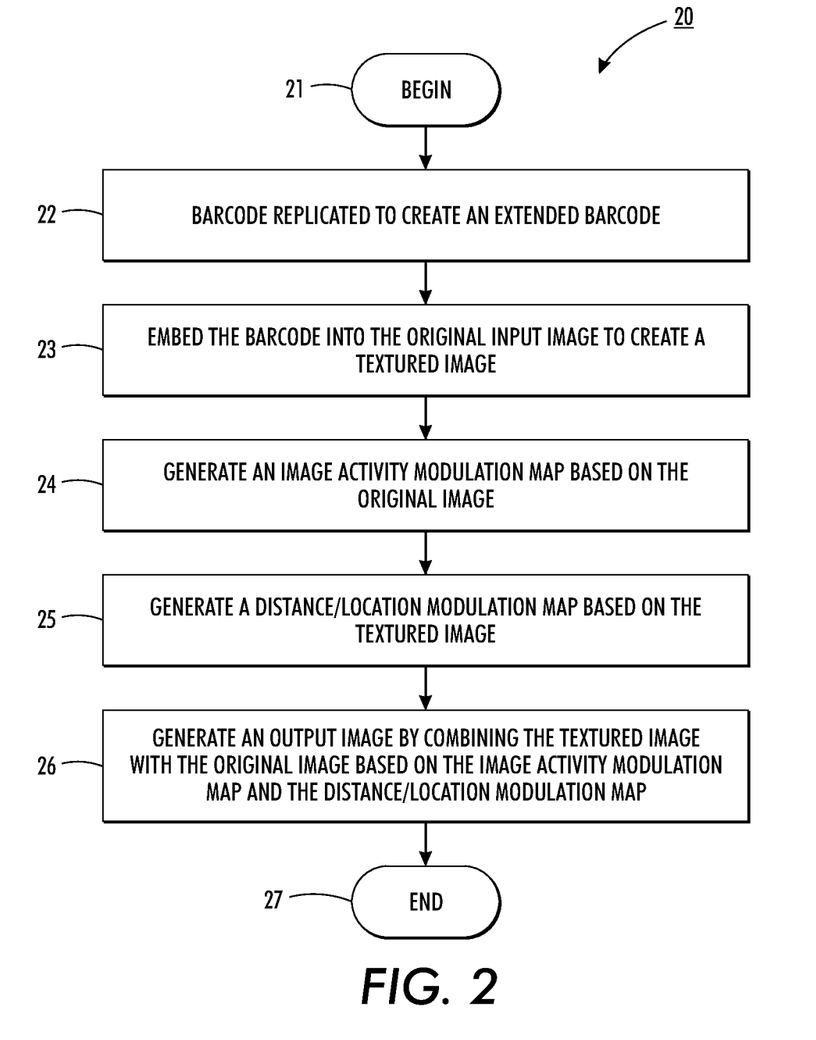
FIG. 2 is a flowchart summarizing an image processing method in accordance with an aspect of the present disclosure.
Figure 5:
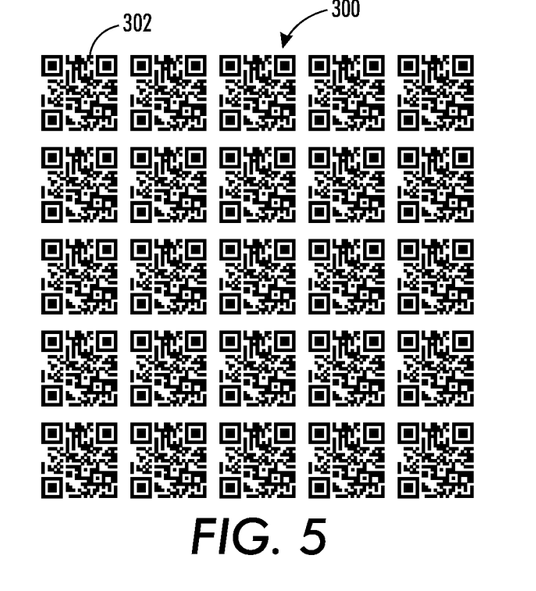
FIG. 5 is an illustration of a replicated barcode in accordance with an aspect of the present disclosure.
Figure 6:
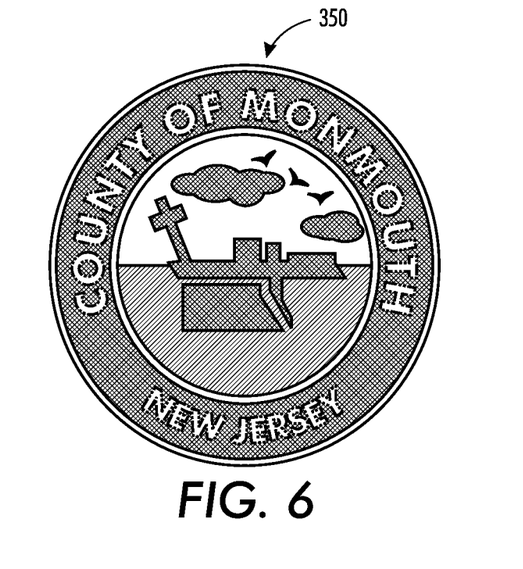
FIG. 6 is an original input image in accordance with an aspect of the present disclosure.

Referring to FIG. 2, a flowchart summarizing a process 20 of embedding a barcode in a logo is shown and is described in detail below. The process 20 begins at step 21 and continues with step 22 where the barcode to be embedded is replicated to generate an extended barcode. Referring to FIG. 5, an example of a replicated barcode is presented. As shown in FIG. 5, barcode 302 is a copy of barcode 100 shown in FIG. 1. Barcode 302 is sized and replicated into a matrix to form extended barcode 300. In an embodiment, extended barcode 300 is sized and shaped so that it is at least the same size as an original input image. In this example, the input image is logo 350 shown in FIG. 6.

Referring again to FIG. 2, the process continues to step 23. The extended barcode generated at step 22 step is embedded into the input image to create a textured image. In an embodiment, the textured image is created using a method disclosed in U.S. patent application Ser. No. 13/XXX,XXX, filed concurrently hereto, titled SYSTEM AND METHOD FOR CREATING MACHINE-READABLE CODES IN COMBINATION WITH OTHER IMAGES SUCH AS LOGOS, and incorporated herein by reference. In this embodiment, the method achieves the best image quality while maintaining a sufficient symbol contrast. A printer gamut is divided into three reflectance regions, a bright region, a dark region, and a middle region based on a reflectance threshold and a minimum barcode contrast. A virtual gamut is generated with colors present in the bright and dark regions of the printer gamut. A logo image is gamut mapped with the virtual gamut to create a target logo image. An image of a logo with an embedded barcode is produced using the colors specified in the target logo. The process is repeated with varying reflectance threshold values. An image quality score is measured for each resulting image. The image with the highest image quality score is selected as the textured image.

The process continues to step 24 where an image activity index map is generated. The image activity index map is a collection of stored activity index values for some or all of the pixels in an image. The image activity index map may be stored as embedded data within the image itself, or may be an external table or database relating the pixel location with the associated activity index value. The embodiments are not limited in this regard.

An activity index measures the amount of activity in the area surrounding the pixel. In an embodiment, a local variance for each pixel is evaluated and an activity index is generated. The local variance is a measure of the "activity" of the area surrounding the pixel. The activity index is a normalized, scaled value between a minimum and a maximum value that represents the magnitude of the local variance. For example, if a pixel is located in an area of the image where activity is high, e.g. an area with writing or other graphic material with varying colors and contrast, then the pixel will be given a high activity index. If the pixel is located in an area with minimal activity, e.g. an area that is flat and/or solid, then the pixel will be given a low activity index.

Figure 7:
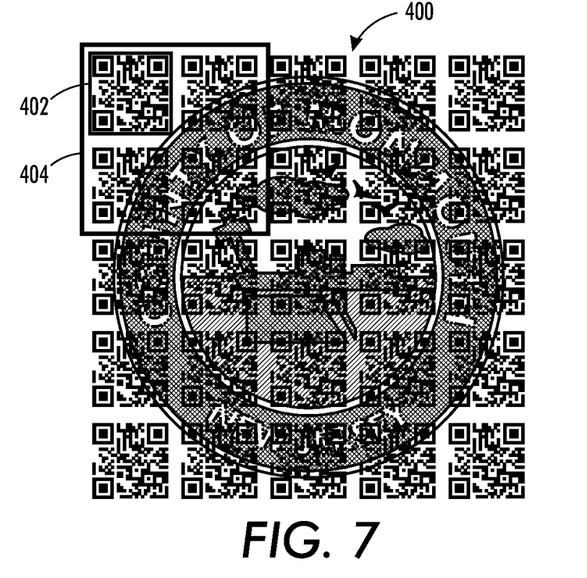
FIG. 7 is an illustration of a textured image in accordance with an aspect of the present disclosure.

In an embodiment, the local variance may be scaled to an activity index between 0 and 1, with 0 indicating a flat area or minimum activity and 1 indicating the area with maximum activity. The activity index of each pixel is mapped to each pixel of the original image to generate an activity index map. There are two exceptions, and both are illustrated in FIG. 7: 1) in the barcode region 402, the activity index is set to 0, regardless of the local variance; 2) for the transition region 404 that surrounds the barcode region 402, the activity index transitions smoothly from 0 to the calculated activity index. The barcode region 402 may include an entire copy of the barcode being embedded. Identifying a barcode region and setting the activity index to a minimum value for all pixels within the barcode region ensures that at least one readable barcode will be present in the output image. The transition region is a region immediately surrounding the barcode region that ensures the activity index of the pixels will smoothly transition between the minimum activity index (i.e. 0) in the barcode region and the calculated activity index based on the local variance. This avoids jarring discontinuities in activity index that may be created by the barcode region.

In an embodiment, the barcode region 402 and a transition distance may be predetermined by a user. The transition region 404 is generated by determining the portion of the textured image that is within the transition distance from the edge of the barcode region 402. The size and shape of the transition region can be calculated linearly, radially, or using any other method suitable for determining the transition region. The embodiments of the present disclosure are not limited in this regard.

Referring again to FIG. 2, the location index map is generated in step 25. A location index map is a collection of stored location index values for some or all of the pixels in an image. Similar to the image activity index map, the location index map is a collection of stored location index values for some or all of the pixels in an image. The location index map may be stored as embedded data within the image itself, or may be an external table or database relating the pixel location with the associated activity index value. The embodiments are not limited in this regard.

A location index is generated which specifies the location-dependent texture visibility. In an embodiment, in which the barcode region is designed at the top left corner, the location index is scaled between a minimum and a maximum value, e.g. between 0 and 1. The location index for pixel (x,y) is calculated as the square of the distance between the pixel (x,y) and the center of the image, normalized by the square distance between the right-bottom of the barcode to the image center. For any value that is greater than 1, the index is set to 1. As two specific examples, the center of the image has a location index value of 0, and the pixels in the barcode have a location index value of 1. The underlying rationale is that the center region of the logo usually conveys more visual information, so it is desired to assign a lower location index to pixels that are near the center of the logo.

Figure 8:
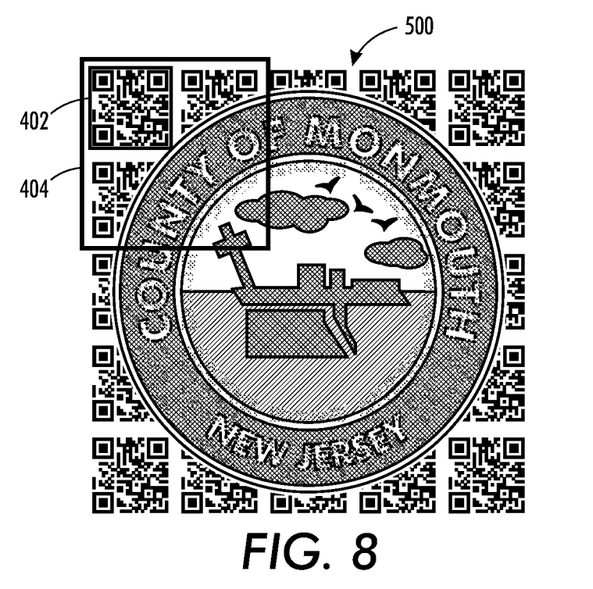
FIG. 8 is an illustration of an output image in accordance with an aspect of the present disclosure.

The two indices, activity and location, are combined and an output image is generated at step 26. In an embodiment, a combined index $\alpha(x,y)$ for a pixel (x,y) is calculated as $$\alpha(x,y) = \text{act}(x,y)[1 - \text{loc}(x,y)], \quad \text{(Equation 1)}$$

where act(x, y) and loc(x, y) are activity and location indices, respectively. The final result r(x,y) is obtained by $$r(x,y) = \alpha(x,y)i(x,y) + [1 - \alpha(x,y)]t(x,y), \quad \text{(Equation 2)}$$

where i(x,y) and t(x,y) are input and texture images, respectively. The resulting image is shown in FIG. 8. After the output image has been generated, the process continues to step 27 where the process ends.

Figure 3:
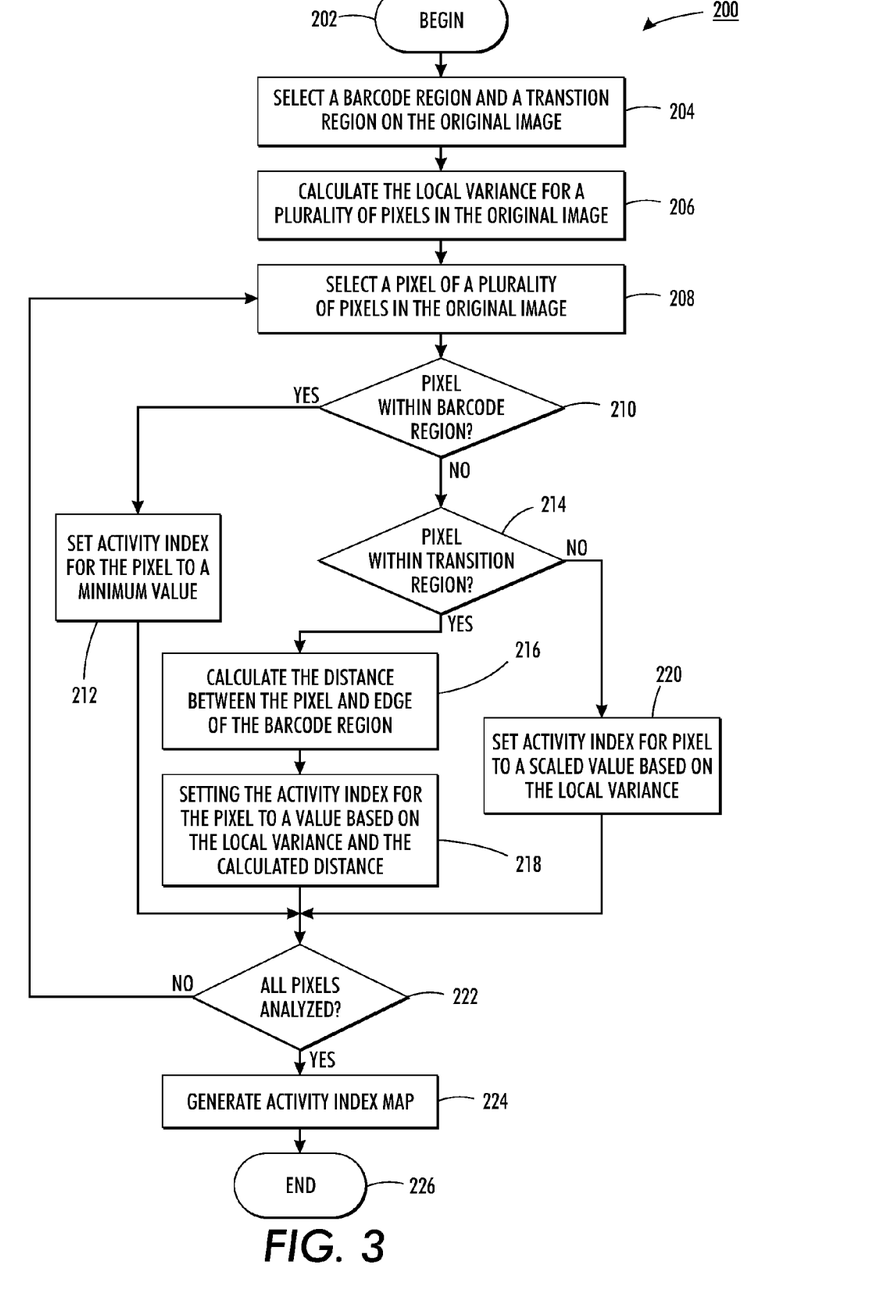
FIG. 3 is a flowchart summarizing an image-processing method in accordance with an aspect of the present disclosure.

Referring now to FIG. 3, a flow diagram is presented that illustrates a process 200 that generates an activity index map in accordance with an embodiment of the present disclosure. Process 200 begins at step 202 and continues to step 204 where a barcode region and a transition region is selected on the original image. As discussed above in relation to FIG. 7, the barcode region may be predetermined by the user or selected through any other method.

Referring again to FIG. 3, the process continues to step 206, where a local variance is calculated for a plurality of pixels in the original image. As described above, the local variance is a pixel value that describes the level of activity surround a particular pixel. The plurality of pixels analyzed may be some or all of the pixels in the original image. For example, the plurality of pixels may exclude the pixels within the barcode region since the local variance is not used to determine the activity index for those pixels. Alternatively, the local variance may be determined for all pixels in the image prior to selecting the barcode region. Optionally, the local variance may be scaled to a normalized range that includes numbers from a minimum value to a maximum value. For example, the scaled local variance may be a number between 0 and 1, where the pixel with the highest local variance is given a value of 1. The embodiments of present disclosure are not limited in this regard.

A textured image 400 generated at step 206 is illustrated in FIG. 7. The textured image 400 may be combined with the input image 350 to produce the output image 500, discussed below in relation to FIG. 8. The output image may contain two parts, a barcode region 402 and the rest of the image. The barcode region may be copied from the textured image. The rest of the image may be obtained by combining textured and input images with a goal for improving image quality. The transition between two parts should be smooth. In some embodiments, the details in the input image may be substantially retained, since detail loss is the main source here for image quality degradation. Retaining this detail may be achieved by controlling the mixture process with two maps, an image activity index map and a location index map.

In step 208, a pixel is selected from the plurality of pixels and it is determined whether the pixel is within the barcode region in step 210. If the selected pixel is in the barcode region (210: Yes), the activity index is set to a minimum value, e.g. 0, in step 212. Alternatively, if the pixel is not within the barcode region (210: No), the process continues to step 214 where it is determined whether the pixel is in the transition region. If so (214: Yes), the process continues to step 216 where the distance between the pixel and the edge of the barcode region is calculated. This distance may be calculated by locating the nearest barcode region pixel to the selected pixel and determining the distance between them. Once this distance is calculated, the process continues to step 218 where the activity index for the pixel is set to a value based on the local variance and the distance calculated in step 216. If, however, the pixel is not in the transition region (214: No), the activity index for the pixel is set to a value based on the local variance in step 220. In an embodiment, the value for the activity index may be set based on the scaled value described above. In this embodiment, the activity index set in step 220 may be in the scaled value of the local variance. Consequently, the activity index set in step 218 may be a value between the minimum value, i.e. 0, and the scaled value of the local variance based on how far away the pixel is from the barcode region.

After the activity index for the pixel is set, the process continues to step 222 where it is determined whether all pixels have been analyzed. If not (222: No), the process returns to step 208 where another pixel is selected and the subsequent process is repeated. If all pixels have been analyzed (222: Yes), the process continues to step 224 where the activity index map is generated and stored. The process concludes at step 226.

Figure 4:
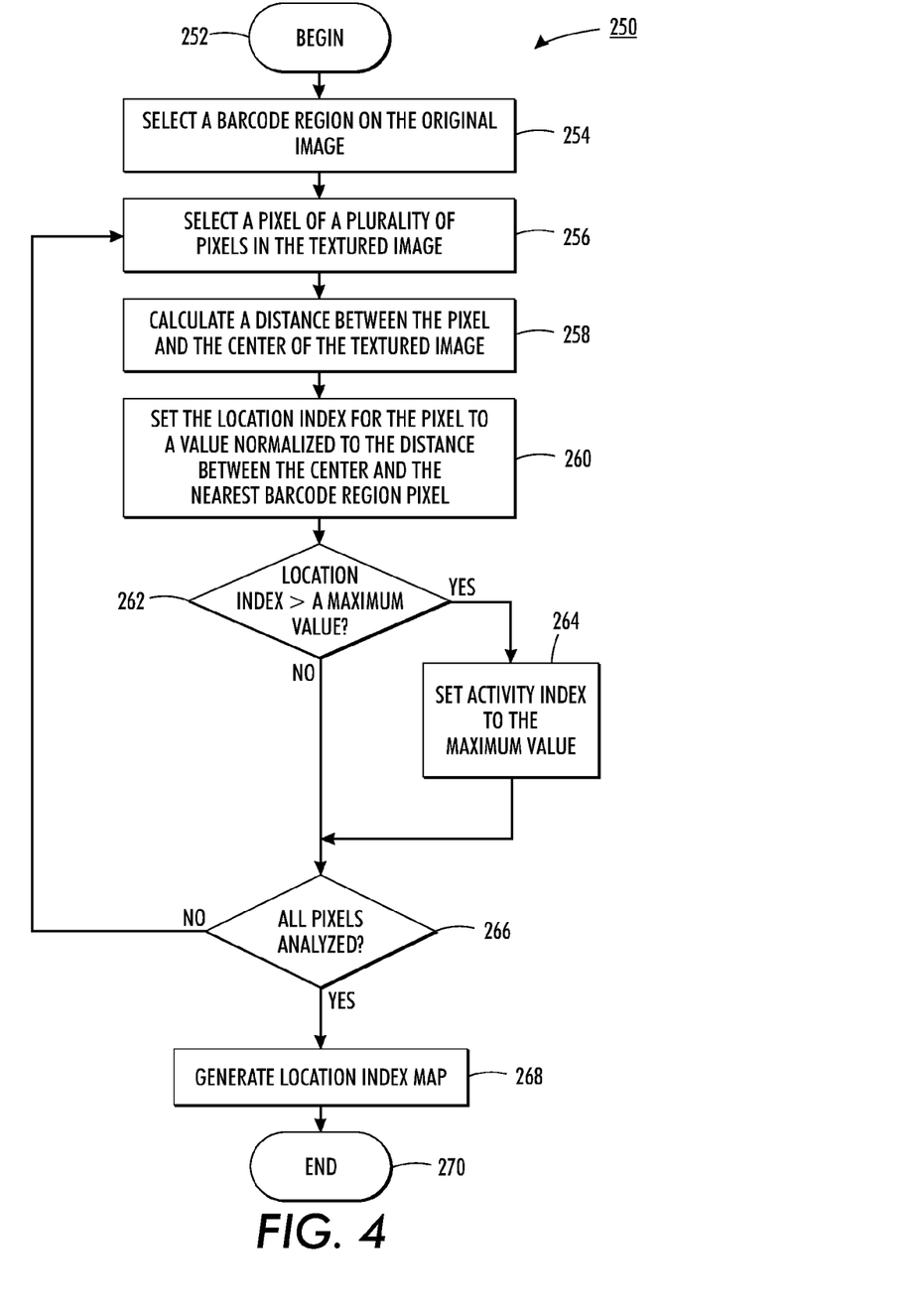
FIG. 4 is a flowchart summarizing an image processing method in accordance with an aspect of the present disclosure

Referring now to FIG. 4, a flow diagram is presented that illustrates a process 250 that generates an location index map in accordance with an embodiment of the present disclosure. Process 250 begins at step 252 and continues to step 254 where a barcode region is selected on the original image. As discussed above in relation to FIG. 7, the barcode region may be predetermined by the user or selected through any other method.

The process continues to step 256, where a pixel is selected from the plurality of pixels in the textured image discussed above in relation to FIG. 7. In step 258, the distance between the pixel selected in step 256 and the center of the image is calculated. The process continues to step 260 where the location index for the pixel is set to a value based on the distance between the pixel and the center of the textured image. In an embodiment, the value may be normalized to a second distance measured between the center of the textured image and the edge of the barcode region. For example, the second distance may be determined by locating the nearest barcode region pixel and measuring its distance from the center of the image. This second distance is then normalized to equal 1. Therefore, all location index values for pixels that are closer to the center of the textured image than the barcode region are set to a value between 0 and 1. Optionally, in step 262, a maximum value may be assigned to the location index, e.g. 1. If a location index is greater than the maximum value (262: Yes), then the value for the location index is set to equal 1 in step 264. If the location index is not greater than the maximum value, the location index remains at the value set in step 260.

After the location index for the pixel is set, the process continues to step 266 where it is determined whether all pixels have been analyzed. If not (266: No), the process returns to step 256 where another pixel is selected and the subsequent process is repeated. If all pixels have been analyzed (266: Yes), the process continues to step 268 where the activity index map is generated and stored. The process concludes at step 270.

Figure 9:
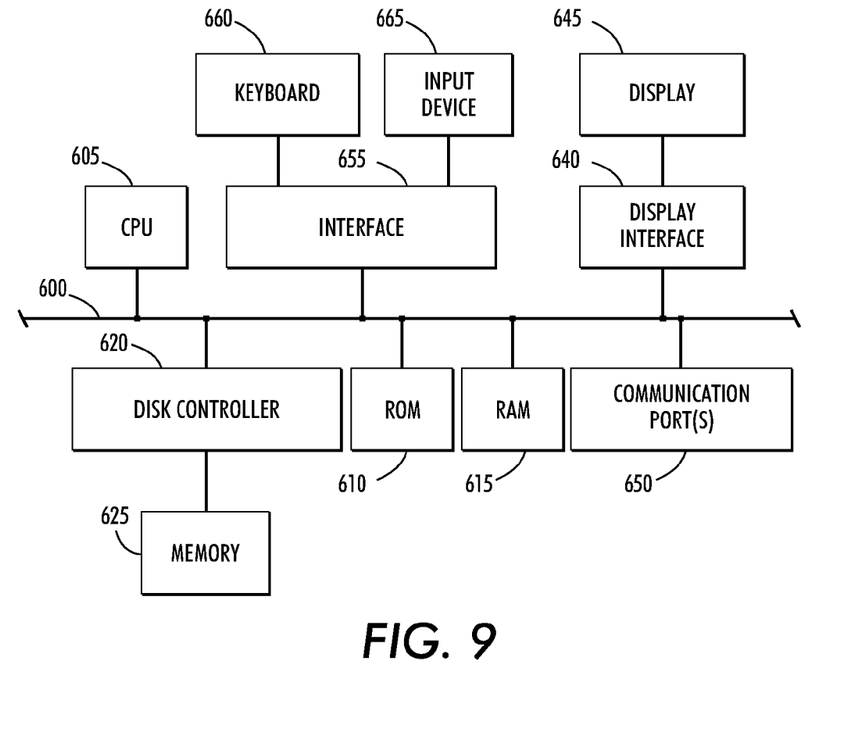
FIG. 9 is a is a block diagram depicting elements that may be present in an electronic device or a computing device in accordance with an aspect of the present disclosure.

FIG. 9 depicts a block diagram of internal hardware that may be used to contain or implement the process discussed above. A bus 600 serves as the main information highway interconnecting the other illustrated components of the hardware. CPU 605 is a processor, the central processing unit of the system that performs calculations and logic operations required to execute a program. CPU 605, alone or in conjunction with one or more of the other elements disclosed in FIG. 9, is a processing device, computing device or processor as such terms are used within this disclosure. Read only memory (ROM) 610 and random access memory (RAM) 615 constitute exemplary memory devices.

A controller 620 provides an interface between with one or more optional tangible, computer-readable memory devices 625 and the system bus 600. These memory devices 625 may include, for example, an external or internal DVD or CD ROM drive, a hard drive, flash memory, a USB drive or the like. As indicated previously, these various drives and controllers are optional devices. Additionally, the memory devices 625 may be configured to include individual files for storing any software modules or instructions, auxiliary data, common files for storing groups of results or auxiliary, or one or more databases for storing the result information, auxiliary data, and related information as discussed above.

Program instructions, software or interactive modules for performing any of the methods and systems as discussed above may be stored in the ROM 610 and/or the RAM 615. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 640 may permit information from the bus 600 to be displayed on the display 645 in audio, visual, graphic or alphanumeric format. The information may include information related to a current job ticket and associated tasks. Communication with external devices may occur using various communication ports 650. A communication port 650 may be attached to a communications network, such as the Internet or an local area network.

The hardware may also include an interface 655 which allows for receipt of data from input devices such as a keyboard 660 or other input device such as a mouse 665, a joystick, a touch screen, a remote control, a pointing device, a video input device and/or an audio input device.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A method of creating an image by a processor, comprising:
generating an extended barcode comprising a plurality of copies of a barcode by replicating the barcode into a matrix having a size that is at least as large as a size of an original image;
generating a textured image by embedding the extended barcode into the original image, wherein the extended barcode extends at least to all edges of the original image;
selecting a barcode region that includes a machine readable copy of the barcode;

selecting a transition region that includes a set of pixels that are within a predetermined distance from the barcode region; and generating an output image by combining the textured image with the original image based on the barcode region and the transition region.

2. The method of claim 1, wherein generating the output image further comprises:

generating an activity index map by determining an activity index for a plurality of the pixels in the original image; and generating a location index map by determining a location index for a plurality of the pixels in the textured image.

3. The method of claim 2 wherein generating an activity index map further comprises:

determining a local variance for a plurality of pixels in the original image; and selecting a first pixel.

4. The method of claim 3, further comprising:

on a condition that the first pixel is within the barcode region, setting an activity index for the first pixel to a minimum value.

5. The method of claim 4, on a condition that the first pixel is not within either the barcode region or the transition region, setting the activity index to a value based on the local variance.

6. The method of claim 5, further comprising:

on a condition that the first pixel is within the transition region, calculating a distance between the first pixel and a nearest pixel within the barcode region; and setting the activity index to a value based on the local variance and the calculated distance.

7. The method of claim 2, wherein generating a location index map further comprises:

selecting a first pixel;

calculating a first distance between the first pixel and a center of the textured image; and determining a location index for the first pixel based on the first distance.

8. The method of claim 7, further comprising calculating a second distance between the center of the textured image and a second pixel of the barcode region that is nearest to the center of the textured image, wherein the location index is normalized based on the second distance.

9. The method of claim 8, further comprising:

on a condition that the first distance equal to or greater than the second distance, setting the location index to a maximum value.

10. The method of claim 9, further comprising:

on a condition that first distance is less than the second distance, setting the location index to a value between the maximum value and a minimum value based on the square of the first distance.

11. The computer program product of claim 2, wherein the method implemented by the set of instructions further comprises:

selecting a first pixel; and calculating a first distance between the first pixel and a center of the textured image;

wherein determining an activity index comprises:

on a condition that the first pixel is within the barcode region, setting an activity index for first pixel to a minimum value;

on a condition that the first pixel is not within the barcode region and the transition region; setting the activity index to a value based on the local variance; and on a condition that the first pixel is within the transition region, calculating a distance between the first pixel and a nearest pixel within the barcode region; and setting the activity index to a value between the minimum value and the maximum value based on the local variance; and wherein determining a location index comprises:

on a condition that the first distance equal to or greater than the second distance, setting the location index to a maximum value; and on a condition that first distance is less than the second distance, setting the location index to a value between a minimum value and the maximum value based on the square of the first distance.

12. The method according to claim 1, wherein the barcode is one of a data matrix code, a universal product code, a quick response code, an Aztec code, and a MaxiCode.

13. An electronic device, comprising:

a processor; and a non-transitory computer-readable memory containing a barcode image embedding application comprising programming instructions that instruct the processor to:

generate an extended barcode by replicating a barcode into a matrix having a size that is at least as large as a size of an original image;

generate a textured image by embedding the extended barcode into the original image, wherein the extended barcode extends at least to all edges of the original image;

select a barcode region that includes a machine readable copy of barcode;

selecting a transition region that includes a set of pixels that are within a predetermined distance from the barcode region; and generate an output image by combining the textured image with the original image based on the barcode region and the transition region.

14. The electronic device of claim 13, wherein the computer-readable memory further includes programming instructions to instruct the processor to:

generate an activity index map by determining an activity index for each pixel in the original image; and generate a location index map by determining a location index for each pixel in the textured image.

15. The electronic device of claim 14, wherein the computer-readable memory further includes programming instructions to instruct the processor to:

select a first pixel; and determine local variance by examining a plurality of pixels that surround the first pixel, wherein the value based on the local variance is set to a maximum value for a pixel that has the highest local variance.

16. The electronic device of claim 15, wherein the computer-readable memory further includes programming instructions to instruct the processor to:

on a condition that the first pixel is within the barcode region, set an activity index for first pixel to a minimum value;

on a condition that the first pixel is not within the barcode region and the transition region; set the activity index to a value based on the local variance; and on a condition that the first pixel is within the transition region,
    calculate a distance between the first pixel and a nearest pixel within the barcode region; and
    set the activity index to a value between the minimum value and the maximum value based on the local variance.

17. The electronic device of claim 16, wherein the computer-readable memory further includes programming instructions to instruct the processor to:
    select a first pixel;
    calculate a first distance between the first pixel and a center of the textured image; and
    determine a location index for the first pixel based on the first distance.

18. The electronic device of claim 17, wherein the computer-readable memory further includes programming instructions to instruct the processor to:
    calculate a second distance between the center of the textured image and a second pixel of the barcode region that is nearest to the center of the textured image, wherein the location index is normalized based on the second distance.

19. The electronic device of claim 18, wherein the computer-readable memory further includes programming instructions to instruct the processor to:
    on a condition that the first distance equal to or greater than the second distance, set the location index to a maximum value; and
    on a condition that first distance is less than the second distance, set the location index to a value between a minimum value and the maximum value based on the square of the first distance.

20. A computer program product containing a set of instructions that, when executed, instruct a processor of an electronic device to implement a method, wherein the electronic device includes, a processor and a non-transitory computer-readable memory, the method comprising:
    generating an extended barcode by replicating a barcode into a matrix having a size that is at least as large as a size of an original image;
    generating a textured image by embedding the extended barcode and the original image, wherein the extended barcode extends at least to all edges of the original image;
    selecting a barcode region that includes a machine readable copy of barcode;
    selecting a transition region that includes a plurality of pixels that are within a predetermined distance from the barcode region;
    generating an activity index map by determining an activity index for each pixel in the original image based on the barcode region and the transition region;
    generating a location index map by determining a distance index for each pixel in the textured image based on the barcode region; and
    generating an output image by combining the textured image with the original image based on the activity index map and the distance index map.

* * * * *